(12) United States Patent
Fujii et al.

(10) Patent No.: US 10,581,367 B2
(45) Date of Patent: Mar. 3, 2020

(54) ROTATING-ELECTRIC-MACHINE CONTROL APPARATUS

(71) Applicant: Mitsubishi Electric Corporation, Tokyo (JP)

(72) Inventors: Hirofumi Fujii, Tokyo (JP); Kotaro Nakano, Tokyo (JP); Daiki Matsuura, Tokyo (JP); Noriyuki Wada, Tokyo (JP); Yoshihiko Kimpara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/946,967

(22) Filed: Apr. 6, 2018

(65) Prior Publication Data

US 2019/0123677 A1 Apr. 25, 2019

(30) Foreign Application Priority Data

Oct. 20, 2017 (JP) .................................. 2017-203241

(51) Int. Cl.
*H02P 27/12* (2006.01)
*H02P 6/08* (2016.01)
*H02P 23/00* (2016.01)

(52) U.S. Cl.
CPC ................ *H02P 27/12* (2013.01); *H02P 6/08* (2013.01); *H02P 23/0004* (2013.01)

(58) Field of Classification Search
CPC ....................................................... H02P 27/12
See application file for complete search history.

(56) References Cited

U.S. PATENT DOCUMENTS

| 2011/0279071 | A1* | 11/2011 | Yamada | H02P 21/0021 |
| | | | | 318/400.02 |
| 2015/0180386 | A1* | 6/2015 | Enoki | H02P 6/10 |
| | | | | 318/400.23 |
| 2015/0214867 | A1* | 7/2015 | Takahashi | H02P 21/06 |
| | | | | 318/400.02 |
| 2017/0229984 | A1* | 8/2017 | Sato | H02P 6/153 |

FOREIGN PATENT DOCUMENTS

JP 2007-274781 A 10/2007

* cited by examiner

*Primary Examiner* — Kawing Chan
*Assistant Examiner* — Bradley R Brown
(74) *Attorney, Agent, or Firm* — Sughrue Mion, PLLC; Richard C. Turner

(57) ABSTRACT

The rotating-electric-machine control apparatus is provided with two or more torque compensation amount maps that each store a torque compensation amount corresponding to a detection rotation speed and a first torque command and a torque compensation amount map selector that selects a single torque compensation amount map from the two or more torque compensation amount maps, based on at least one of the detection rotation speed and control information indicating a control method utilized by the voltage applying device.

20 Claims, 7 Drawing Sheets

ROTATING-ELECTRIC-MACHINE CONTROL APPARATUS

BACKGROUND OF THE INVENTION

Field of the Invention

The present invention relates to a rotating-electric-machine control apparatus that performs torque control by use of two or more control methods.

Description of the Related Art

A rotating-electric-machine control apparatus is well known that controls the output torque of a rotating electric machine in such a way that the output torque keeps track of a torque command value. In general, such a rotating-electric-machine control apparatus controls a rotating electric machine in such a way that the output torque of the rotating electric machine does not deviate from a torque command value. For example, a conventional rotating-electric-machine control apparatus disclosed in Patent Document 1 has a torque compensation amount map in which in order to prevent the output torque to be outputted from a rotating electric machine from deviating from a torque command value to be inputted to the rotating-electric-machine control apparatus, a torque compensation amount corresponding to the difference between the output torque and the torque command value is preliminarily calculated and is made into a map; the difference between the output torque and the torque command value is reduced by use of the torque compensation amount map.

In the conventional rotating-electric-machine control apparatus disclosed in Patent Document 1, the torque compensation amount map is configured with the rotation speed of a rotating electric machine and the torque command value, as the coordinate axes; thus, when the rotation speed of the rotating electric machine and the torque command value are determined, a correction amount for the torque command value can uniquely be calculated.

PRIOR ART REFERENCE

Patent Document

[Patent Document 1] Japanese Patent Application Laid-Open No. 2007-274781

As is well known, in order to reduce the processing load on a microcomputer provided in a rotating-electric-machine control apparatus or in order to reduce loss energy in the rotating electric machine and the control apparatus, the control methods in the rotating-electric-machine control apparatus may be switched in accordance with a change in the rotation speed of the rotating electric machine or in the torque command value. Moreover, in the case where when a control method based on the PWM (Pulse Width Modulation) control is utilized, the carrier frequency of a carrier wave for creating a pulse or the ratio of the rotation speed of the rotating electric machine to the carrier frequency changes, the modulation method for the carrier wave may be switched from one of the two-phase modulation method and the three-phase modulation method to the other one thereof. In this case, the torque correction amount is a value that differs depending on each of the two or more PWM control methods. Accordingly, in the case where when the respective torque compensation amount maps in the two or more control methods are set with the same correction amount, a rotating electric machine is controlled through the two or more control methods, based on the torque compensation amount maps, a difference between the output torque of the rotating electric machine and the torque command value may be caused and hence the accuracy of the torque control may be deteriorated.

Although as described above, having the torque compensation amount map configured with the rotation speed of a rotating electric machine and the torque command value, as the coordinate axes, the conventional rotating-electric-machine control apparatus disclosed in Patent Document 1 has no torque compensation amount map corresponding to two or more control methods; thus, there has been a problem that when the control methods are switched, a difference between the torque command value and the output torque of the rotating electric machine is caused and hence the accuracy of the torque control is deteriorated.

The present invention has been implemented in order to solve the foregoing problems in a conventional rotating-electric-machine control apparatus; the objective thereof is to provide a rotating-electric-machine control apparatus that can correct the torque command, based on a torque compensation amount corresponding to a control method to be selected when the control methods for converting a DC voltage into an AC voltage are switched, so as to raise the accuracy of the torque control.

SUMMARY OF THE INVENTION

A rotating-electric-machine control apparatus according to the present invention includes
- a voltage applying device that converts a DC voltage outputted from a DC power source into an AC voltage and then applies the AC voltage converted to a rotating electric machine,
- a rotation speed detector that detects a rotation speed of the rotating electric machine and then output the rotation speed detected, as a detection rotation speed,
- a current detector that detects a current flowing in the rotating electric machine and then outputs the current detected, as a detection current,
- a torque controller that generates a second torque command, based on a first torque command provided from the outside and the detection rotation speed, and then outputs the second torque command generated, and
- a current controller that generates a voltage command, based on the second torque command and the detection current, and then outputs the voltage command generated; the rotating-electric-machine control apparatus is characterized
- in that based on the voltage command outputted from the culler, the voltage applying device is controlled,
- in that the voltage applying device converts the DC voltage into the AC voltage by use of any one of two or more different control methods, and switches the control method utilized in the conversion from one of the two or more control methods to another control method, based on a rotation speed of the rotating electric machine,
- in that the torque controller includes two or more torque compensation amount maps that each store a torque compensation amount corresponding to a detection rotation speed and a first torque command and a torque compensation amount map selector that selects a single torque compensation amount map from the two or more torque compensation amount maps, based on at least one of the detection rotation speed and control information indicating a control method utilized in the conversion by the voltage applying device, and in that the torque compensation amount stored in the torque compensation amount map selected by the torque compensation amount map selector is added to the first torque command and is outputted as the second torque command.

A rotating-electric-machine control apparatus according to the present invention includes a voltage applying device that converts a DC voltage outputted from a DC power source into an AC voltage and then applies the AC voltage converted to a rotating electric machine, a rotation speed detector that detects a rotation speed of the rotating electric machine and then output the rotation speed detected, as a detection rotation speed, a current detector that detects a current flowing in the rotating electric machine and then outputs the current detected, as a detection current, a torque controller that generates a second torque command, based on a first torque command provided from the outside and the detection rotation speed, and then outputs the second torque command generated, and a current controller that generates a voltage command, based on the second torque command and the detection current, and then outputs the voltage command generated; the rotating-electric-machine control apparatus is characterized in that based on the voltage command outputted from the current controller, the voltage applying device is controlled, in that there is provided a voltage detector that detects a DC voltage outputted from the DC power source and then outputs a detection DC voltage, in that the voltage applying device converts the DC voltage into the AC voltage by use of any one of two or more different control methods, and switches the control method utilized in the conversion from one of the two or more control methods to another control method, based on a rotation speed of the rotating electric machine, in that the torque controller includes two or more torque compensation amount map groups including two or more respective torque compensation amount maps that each store a torque compensation amount corresponding to the detection rotation speed, the first torque command, and detection DC voltage, and a torque compensation amount map selector that selects a single torque compensation amount map group from the two or more torque compensation amount map groups, based on at least one of the detection rotation speed and control information indicating the control method, utilized in the conversion by the voltage applying device, and that selects, based on the detection DC voltage, a single torque compensation amount map from two or more torque compensation amount maps included in the selected torque compensation amount map group, in that the two or more torque compensation amount maps included in the torque compensation amount map group are two or more torque compensation amount maps that are provided in such a way as to correspond to respective different values of the detection DC voltage and store respective different torque compensation amounts, and in that the torque compensation amount stored in the torque compensation amount map selected by the torque compensation amount map selector is added to the first torque command and is outputted as the second torque command.

In a rotating-electric-machine control apparatus according to the present invention, the voltage applying device converts the DC voltage into the AC voltage by use of any one of two or more different control methods, and switches the control method utilized in the conversion from one of the two or more control methods to another control method, based on a rotation speed of the rotating electric machine; the torque controller includes two or more torque compensation amount maps that each store a torque compensation amount corresponding to a detection rotation speed and a first torque command and a torque compensation amount map selector that selects a single torque compensation amount map from the two or more torque compensation amount maps, based on control information indicating a control method utilized in the conversion by the voltage applying device; the torque compensation amount stored in the torque compensation amount map selected by the torque compensation amount map selector is added to the first torque command and is outputted as the second torque command. As a result, it is made possible to calculate a torque compensation amount corresponding to an operating control method when control methods for converting a DC voltage of the rotating-electric-machine control apparatus into an AC voltage are switched; thus, the torque accuracy can be raised.

In a rotating-electric-machine control apparatus according to the present invention, there is provided a voltage detector that detects a DC voltage outputted from the DC power source and then outputs a detection DC voltage; the voltage applying device converts the DC voltage into the AC voltage by use of any one of two or more different control methods, and switches the control method utilized in the conversion from one of the two or more control methods to another control method, based on a rotation speed of the rotating electric machine; the torque controller includes two or more torque compensation amount map groups including two or more respective torque compensation amount maps that each store a torque compensation amount corresponding to the detection rotation speed, the first torque command, and detection DC voltage, and a torque compensation amount map selector that selects a single torque compensation amount map group from the two or more torque compensation amount map groups, based on at least one of the detection rotation speed and control information indicating the control method, utilized in the conversion by the voltage applying device, and that selects, based on the detection DC voltage, a single torque compensation amount map from two or more torque compensation amount maps included in the selected torque compensation amount map group; the two or more torque compensation amount maps included in the torque compensation amount map group are two or more torque compensation amount maps that are provided in such a way as to correspond to respective different values of the detect on DC voltage and store respective different torque compensation amounts; the torque compensation amount stored in the torque compensation amount map selected by the torque compensation amount map selector is added to the first torque command and is outputted as the second torque command. As a result, it is made possible that even when the DC voltage outputted from the DC power source is variable, the torque accuracy is prevented from being deteriorated.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Hereinafter, a rotating-electric-machine control apparatus according to Embodiment 1 of the present invention will be explained.

Figure 1:
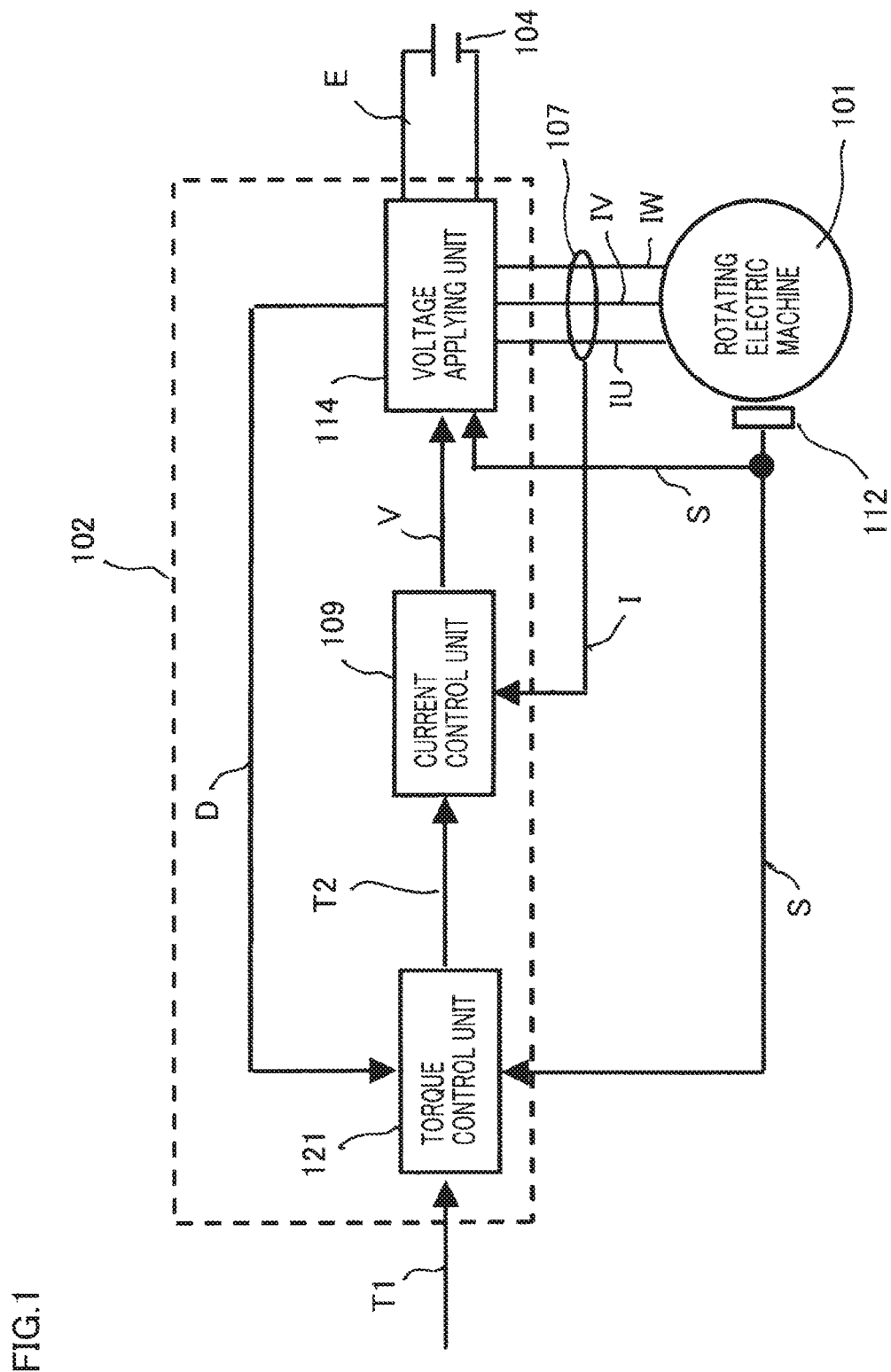
FIG. 1 is a control block diagram representing a rotating-electric-machine control apparatus according to Embodiment 1 of the present invention.

FIG. 1 is a control block diagram representing a rotating-electric-machine control apparatus according to Embodiment 1 of the present invention. In FIG. 1, a rotating-electric-machine control apparatus 102 controls electric power to be supplied to the armature winding (unillustrated) of a rotating electric machine 101, which is, for example, a three-phase AC motor, so as to control the output of the rotating electric machine 101. The rotating-electric-machine control apparatus 102 in FIG. 1 is represented, as a configuration at a time torque control of the rotating electric machine 101 is performed, and is provided with a voltage applying unit 114 as a voltage applying device, a torque control unit 121 as a torque controller, and a current control unit 109 as a current controller.

The voltage applying unit 114 converts a DC voltage F, which is the output voltage of a DC power source 104, into an AC voltage, and applies the AC voltage to the armature winding of the rotating electric machine 101. Armature currents IU, IV, and IW to be outputted from the voltage applying unit 114 are supplied to the armature winding of the rotating electric machine 101.

There exist two or more control methods that are utilized in the voltage applying unit 114. For example, there can be utilized PWM control in which a comparator or the like compares a command signal with a carrier wave such as a triangular wave or a sawtooth wave and then a time in which a DC voltage is applied is changed, based on the result of the comparison.

As the control methods in the foregoing PWM control, there exist a control method (hereinafter, this control method will be referred to as a first control method) in which in consideration of the load or the like on calculation processing in the rotating-electric-machine control apparatus 102, the carrier frequency of the carrier wave is determined and a control method (hereinafter, this control method will be referred to as a second control method) in which in order to synchronize a desired output timing of an AC current with a DC voltage applying timing, the ratio of a detection rotation speed S, outputted from a rotation speed detection unit 112 as a rotation speed detector such as a synchronous resolver, to the carrier frequency is changed.

As other control methods in the PWM control, there are also a control method (hereinafter, this control method will be referred to as a third control method) where there is performed a three-phase modulation method in which the respective modulations of the U-phase voltage, V-phase voltage, and W-phase voltage are the same except that the respective phases of the U-phase voltage, V-phase voltage, and U-phase voltage are shifted by 120° from one another and a control method (hereinafter, this control method will be referred to as a fourth control method) where there is performed a two-phase modulation method in which one of the three phases is switched as less frequently as possible so that the frequency of turning on or off the DC voltage E is decreased and hence the switching loss caused at the timings of turning on or off the DC voltage E, which is performed in the voltage applying unit 114, is reduced.

In the rotating-electric-machine control apparatus according to Embodiment 1 of the present invention, the foregoing PWM control is configured, as described later, in such a way that one specific control method among the foregoing two or more control methods can be switched to another control method in accordance with the detection rotation speed S. It may be allowed that instead of switching the control method in the PWM control in accordance with the detection rotation speed S of the rotating electric machine 101, the foregoing control method in the PWM control is switched in accordance with an after-mentioned first torque command T1 for the rotating electric machine 101.

The voltage applying unit 114 inputs control information D, which indicates which type of control method is the present control method utilized for the PWM control, to an after-mentioned torque compensation amount map selector in the torque control unit 121. The control information D is information that indicates which type of control method is the control method in the present PWM control.

Based on the control information D inputted from the voltage applying unit 114 and the detection rotation speed S, which corresponds to the rotation speed of the rotating electric machine 101 detected by the rotation speed detection unit 112, the torque control unit 121 corrects the first torque command provided from the outside and outputs as a second torque command T2 for controlling the inside of the rotating electric machine 101. Describing in more detail, in order to stabilize the output torque of the rotating electric machine 101, the torque control unit 121 corrects the first torque command T1 based on a torque compensation amount, generates the second torque command T2 suitable for the control method in the PWM control with which the voltage applying unit 114 is controlled, and outputs the second torque command T2.

The current control unit 109 converts the second torque command 12 outputted from the torque control unit 121 into a voltage command V and provides the voltage command V to the voltage applying unit 114. Based on the voltage command V provided from the current control unit 109, the voltage applying unit 114 converts the DC voltage into an AC voltage, through the foregoing PWM control, and then applies the AC voltage to the armature winding of the rotating electric machine 101. As a result, the voltage applying unit 114 supplies the armature currents ID, IV, and IW, which are three-phase alternating currents, to the armature winding of the rotating electric machine 101. The stator of the rotating electric machine 101 generates a rotating magnetic field, based on the armature currents IU, IV, and IW supplied to the armature winding, so as to rotate the rotor.

The current control unit 109 performs current feedback control by use of a detection current I outputted from a current detection. unit 107 as a current detector that measures the armature currents ID, IV, and IW flowing between the rotating electric machine 101 and the voltage applying unit 114 and a current command value.

Figure 2:
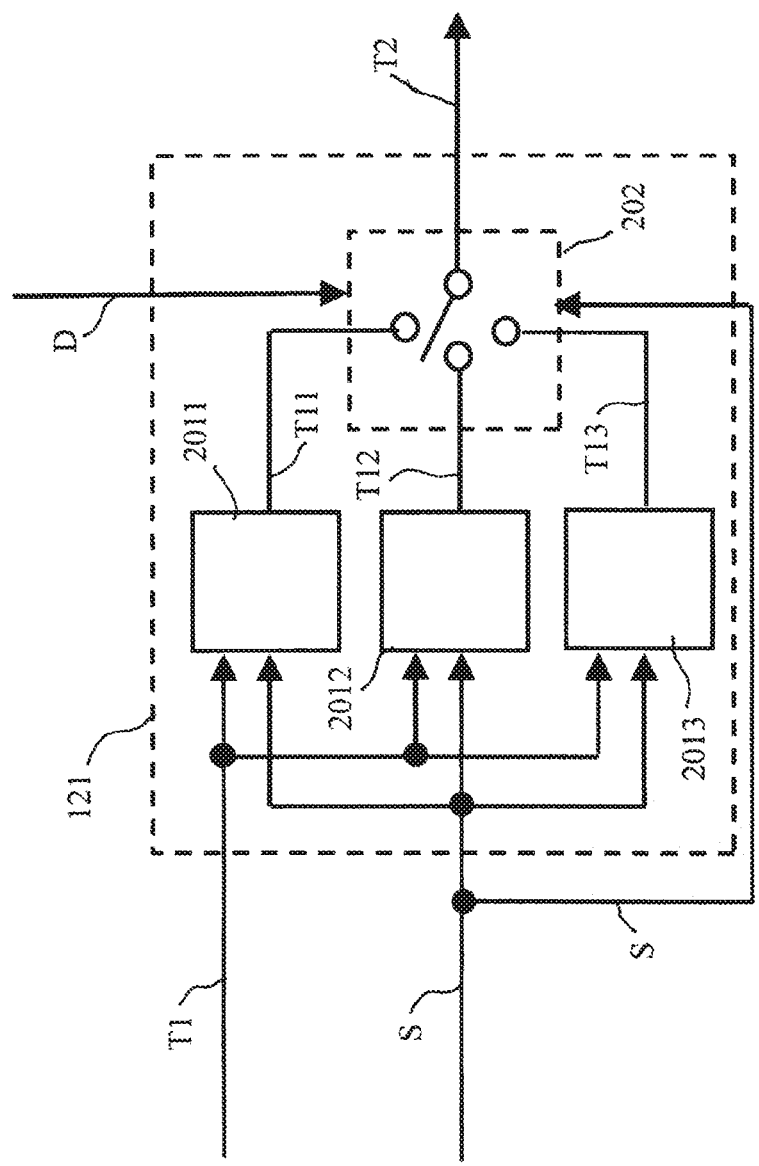
FIG. 2 is a control block diagram representing the internal configuration a torque control unit in the rotating-electric-machine control apparatus according to Embodiment 1 of the present invention.

Next, the foregoing torque control unit 121 will be explained in detail. FIG. 2 is a control block diagram representing the internal configuration of the torque control unit in the rotating-electric-machine control apparatus according to Embodiment 1 of the present invention. In FIG. 2, the torque control unit 121 is provided with a first torque compensation amount map 2011, a second torque compensation amount map 2012, and a third torque compensation amount map 2013, which are two or more torque compensation amount maps. The torque control unit 121 is further provided with a torque compensation amount map selector 202. The number of the torque compensation amount maps is not limited to 3 represented in FIG. 2; the number thereof may be the same as or smaller than 3 or larger than 3.

The first torque compensation amount map 2011 calculates a first torque compensation amount, which is uniquely determined based on the first torque command T1 provided from the outside and the detection rotation speed S outputted by the rotation speed detection unit 112, adds the calculated first torque compensation amount to the first torque command T1, and outputs a first compensated torque command T11. The first torque compensation amount map 2011 is configured as a map for the discrete first torque command T1 and the discrete detection rotation speed S; the first torque compensation amount in the discrete-value region may be obtained through linear interpolation, by extracting the most approximate discrete value, or through spline interpolation.

The second torque compensation amount map 2012 calculates a second torque compensation amount, which is uniquely determined based on the first torque command T1 provided from the outside and the detection rotation speed S outputted by the rotation speed detection unit 112, adds the calculated second torque compensation amount to the first torque command T1, and outputs a second compensated torque command T12. The second torque compensation amount map 2012 is configured as a map for the discrete first torque command T1 and the discrete detection rotation speed S; the second torque compensation amount in the discrete-value region may be obtained through linear interpolation, by extracting the most approximate discrete value, or through spline interpolation.

The third torque compensation amount map 2013 calculates a third torque compensation amount, which is uniquely determined based on the first torque command T1 provided from the outside and the detection rotation speed S detected by the rotation speed detection unit 112, adds the calculated third torque compensation amount to the first torque command T1, and outputs a third compensated torque command T13. The third torque compensation amount map 2013 is configured as a map for the discrete first torque command T1 and the discrete detection rotation speed S; the third torque compensation amount in the discrete-value region may be obtained through linear interpolation, extracting the most approximate discrete value, or through spline interpolation.

The first torque compensation amount calculated by the first torque compensation amount map 2011, the second torque compensation amount calculated by the second torque compensation amount map 2012, and the third torque compensation amount calculated by the third torque compensation amount map 2013 are the torque compensation amounts corresponding to respective different control methods in the PWM control and are different from one another.

Based on the control information D inputted from the voltage applying unit 114, the torque compensation amount map selector 202 selects any one of the first compensated torque command T11 outputted. from the first torque compensation amount map 2011, the second compensated torque command T12 outputted from the second torque compensation amount map 2012, and the third compensated torque command T13 outputted from the third torque compensation amount map 2013; then, the torque compensation amount map selector 202 outputs the selected compensated torque command, as the second torque command T2. In other words, the torque compensation amount map selector 202 selects the torque compensation amount map corresponding to the control method in the PWM control, which is indicated by the inputted control information D, and then outputs the compensated torque command from the selected torque compensation map, as the second torque command T2.

The torque compensation amount map selector 202 may utilize only the control information D in order to select the torque compensation amount map; alternatively, when the control method in the PWM control has been preliminarily determined for the detection rotation speed S, the torque compensation amount map selector 202 may utilize only the detection rotation speed S so as to select the torque compensation amount map.

Figure 3:
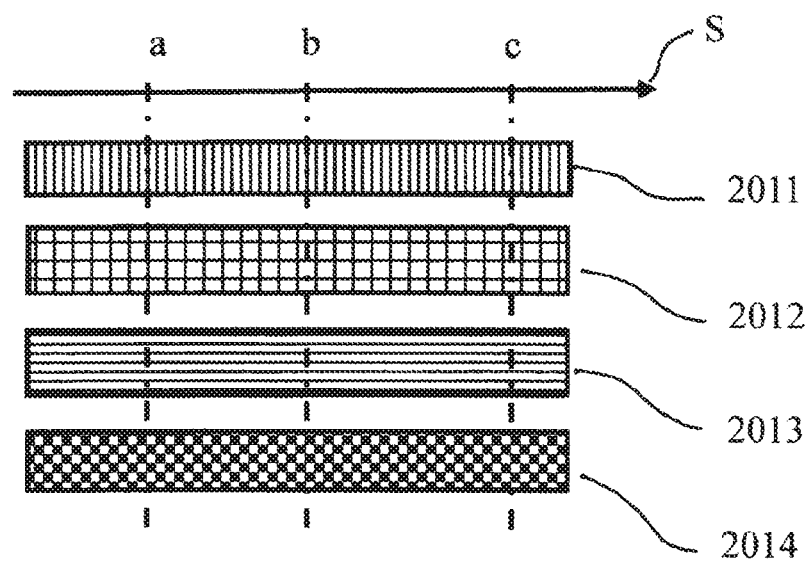
FIG. 3 is an explanatory chart representing the configuration of a torque compensation amount map in the rotating-electric-machine control apparatus according to Embodiment 2 of the present invention.

Next, the torque compensation amount map will be explained in FIG. 3 is an explanatory chart representing the configuration of the torque compensation amount map in the rotating-electric-machine control apparatus according to Embodiment 1 of the present invention. FIG. 3 represents four torque compensation amount maps, i.e., the first torque compensation amount map 2011, the second torque compensation amount map 2012, the third torque compensation amount map 2013, and a fourth torque compensation amount map 2014, as the two or more torque compensation amount maps.

In FIG. 3, the abscissa denotes the detection rotation speed S outputted by the rotation speed detection unit 112. The detection rotation speed S includes three setting rotation speeds, i.e., a first setting rotation speed a, a second setting rotation speed b, and a third setting rotation speed c, as two or more setting rotation speeds for switching the control methods in the PM control. The relative relationship among the first setting rotation speed a, the second setting rotation speed b, and the third setting rotation speed c is [a<b<c]. It may be allowed that two or more (excluding three) setting rotation speeds are set or only one setting rotation speed is set.

It is assumed that as the control methods in the PM control, there exist the foregoing first, second, third, and fourth control methods, that the first control method is utilized when the rotation speed of the rotating electric machine 101 is the same as or lower than the first setting rotation speed a, that the second control method is utilized when the rotation speed of the rotating electric machine 101 is higher than the first setting rotation speed a and the same as or lower than the second setting rotation speed b, that the third control method is utilized when the rotation speed of the rotating electric machine 101 is higher than the second setting rotation speed b and the same as or lower than the third setting rotation speed c, and that the fourth control method is utilized when the rotation speed of the rotating electric machine 101 is higher than the third setting rotation speed c.

The first torque compensation amount map 2011, the second torque compensation amount map 2012, the third torque compensation amount map 2013, and the fourth torque compensation amount map 2014 are the torque compensation amount maps corresponding to the respective different control methods in the PWM control; torque compensation amounts for the respective different control methods in the PWM control are set. The methods of setting the torque compensation amounts in the respective torque compensation amount maps are the same as those described above.

Describing in more detail, in the first torque compensation amount map 2011, there is set the first torque compensation amount corresponding to the first control method in the PWM control, for example, a control method in which in consideration of the load or the like on calculation processing in the rotating-electric-machine control apparatus 102, the carrier frequency of the carrier wave is determined.

In the second torque compensation amount map 2012, there is set the second torque compensation amount corresponding to the second control method in the PWM control, for example, a control method in which in order to synchronize a desired output timing of an AC current with a DC voltage applying timing, the ratio of the detection rotation speed S to the carrier frequency is changed.

In the third torque compensation amount map 2013, there is set the third torque compensation amount corresponding to the third control method in the PWM control, for example, a control method based on a three-phase modulation method in which the respective modulations of the U-phase voltage, V-phase voltage, and U-phase voltage are the same except that the respective phases of the U-phase voltage, V-phase voltage, and U-phase voltage are shifted by 120° from one another.

In the fourth torque compensation amount map 2014 (not represented in FIG. 2), there is set a fourth torque compensation amount corresponding to the fourth control method in the PWM control, for example, a control method based on a two-phase modulation method in which one phase among the U-phase voltage, V-phase voltage, and U-phase voltage, whose respective phases are shifted by 120° from one another, is switched as less frequently as possible.

The torque compensation amount in each of the first torque compensation amount map 2011, the second torque compensation amount map 2012, the third torque compensation amount map 2013, and the fourth torque compensation amount map 2014 may correspond to a control method other than the foregoing control method in the PWM control. The respective contents of the foregoing first, second, third, and fourth control methods are examples and are not limited to the foregoing contents.

In FIGS. 1, 2, and 3, in the case where when the detection rotation speed S is within the region of a speed that is the same as or lower than the first setting rotation speed a, the control information D inputted from the voltage applying unit 114 to the torque compensation amount map selector 202 indicates that the voltage applying unit 114 is PWM-controlled by use of the control method, as the foregoing first control method in the PWM control, in which in consideration of the load or the like on calculation processing in the rotating-electric-machine control apparatus 102, the carrier frequency of the carrier wave is determined, the torque compensation amount map selector 202 selects the first torque compensation amount map 2011 corresponding to the foregoing first control method and then inputs the first compensated torque command T11, as the second torque command T2, which is the output of the first torque compensation amount map 2011, to the current control unit 109.

The current control unit 109 converts the second torque command 12, corrected in accordance with the foregoing first control method in the PWM control, into the voltage command V and then provides the voltage command V to the voltage applying unit 114. Based on the voltage command V provided from the current control unit 109, the voltage applying unit 114 converts the DC voltage E into an AC voltage, through the foregoing first control method in the PWM control, and then applies the AC voltage to the armature winding of the rotating electric machine 101.

Next, when the rotation speed of the rotating electric machine 101 reaches the first setting rotation speed a, the control method in the PWM control for the voltage applying unit 114 is switched from the foregoing first control method to a control method, as the foregoing second control method, in which in order to synchronize a desired output timing of an AC current with a DC voltage applying timing, the ratio of the detection rotation speed S to the carrier frequency is changed. As a result, the contents of the control information D from the voltage applying unit 114 indicates that the control method in the PWM control is the second control method; the torque compensation amount map selector 202 in the torque control unit 121 selects the second torque compensation amount map 2012 corresponding to the second control method and then inputs the second compensated torque command T12, as the second torque command, which is the output of the second torque compensation amount map 2012, to the current control unit 109.

Accordingly, the current control unit 109 converts the second torque command T2, corrected in accordance with the foregoing second control method in the PWM control, into the voltage command V and then provides the voltage command V to the voltage applying unit 114. Based on the voltage command V provided from the current control unit 109, the voltage applying unit 114 converts the DC voltage E into an AC voltage, through the foregoing second control method in the PWM control and then applies the AC voltage to the armature winding of the rotating electric machine 101.

Similarly, when the rotation speed of the rotating electric machine 101 reaches either the second setting rotation speed b or the third setting rotation speed c, the torque compensation amount map corresponding to the selected control method in the PWM control is chosen, as is the case where the rotation speed of the rotating electric machine 101 reaches the foregoing first setting rotation speed a.

In the control method in the PWM control for the voltage applying unit 114, when the rotation speed of the rotating electric machine 101 reaches any one of the first setting rotation speed a, the second setting rotation speed b, and the third setting rotation speed c, as the two or more setting rotation speeds, the present control method in the PWM control is switched to another control method; because the torque compensation amount map selector 202 chooses the torque compensation amount map corresponding to the selected control method, it is made possible to calculate the second torque command T2 that is optimum for the control method and hence the accuracy of the torque control can be raised.

It may be allowed that when the information amount in at least one of the first torque compensation amount map 2011, the second torque compensation amount map 2012, the third torque compensation amount map 2013, and the fourth torque compensation amount map 2014 is larger than the capacity of the memory unit in the rotating-electric-machine control apparatus 102, the particular torque compensation amount map is divided into two or more maps.

Embodiment 2

Figure 4:
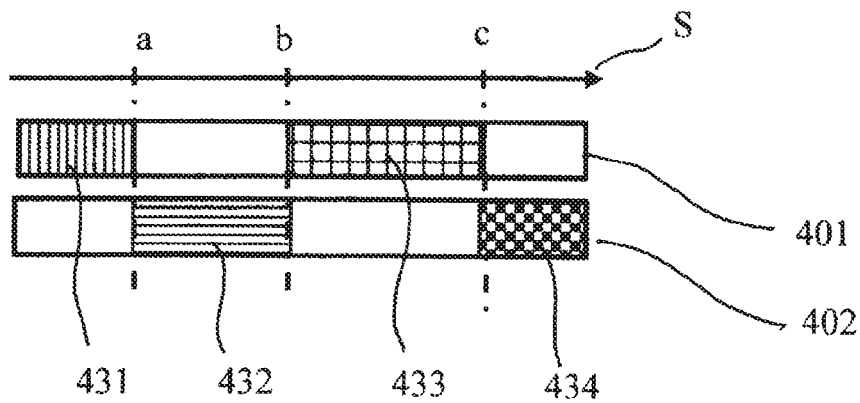
FIG. 4 is an explanatory chart representing the configuration of a torque compensation amount map in the rotating-electric-machine control apparatus according to Embodiment 2 of the present invention.

Next, a rotating-electric-machine control apparatus according to Embodiment 2 of the present invention will be explained. FIG. 4 is an explanatory chart representing the configuration of a torque compensation amount map in the rotating-electric-machine control apparatus according to Embodiment 2 of the present invention. With regard to the torque compensation amount maps in FIG. 4, one torque compensation amount map is made to have two or more torque compensation. amount setting regions so that the information amount to be stored in the memory unit of the rotating-electric-machine control apparatus is reduced. The other configurations are the same as those of the foregoing rotating-electric-machine control apparatus according to Embodiment 1.

In FIG. 4, the abscissa denotes the detection rotation speed S detected by the rotation speed detection unit 112. As is the case with FIG. 3, the detection rotation speed S includes three setting rotation speeds, i.e., the first setting rotation speed a, the second setting rotation speed b, and the third setting rotation speed c, as two or more setting rotation speeds for switching the control methods in the PWM control.

As described above, the control method the PWM control for the voltage applying unit 114 can be switched in accordance with a predetermined rotation speed of the rotating electric machine 101. It is assumed that as the control methods in the PWM control, there exist the foregoing first, second, third, and fourth control methods, that the first control method is utilized when the rotation speed of the rotating electric machine 101 is the same as or lower than the first setting rotation speed a, that the second control method is utilized when the rotation speed of the rotating electric machine 101 is higher than the first setting rotation speed a and the same as or lower than the second setting rotation speed b, that the third control method is utilized when the rotation speed of the rotating electric machine 101 s higher than the second setting rotation speed b and the same as or lower than the third setting rotation speed c, and that the fourth control method is utilized when the rotation speed of the rotating electric machine 101 is higher than the third setting rotation speed c.

A first torque compensation amount map 401 has a first torque compensation amount setting region 431 that stores the torque compensation amount corresponding to the first control method to be utilized when the rotation speed of the rotating electric machine 101 is the same as or lower than the first setting rotation speed a and a third torque compensation amount setting region 433 that stores the torque compensation amount corresponding to the third control method to be utilized when the rotation speed of the rotating electric machine 101 is higher than the second setting rotation speed b and the same as or lower than the third setting rotation speed c.

A second torque compensation amount map 402 has a second torque compensation amount setting region 432 that stores the torque compensation amount corresponding to the second control method to be utilized when the rotation speed of the rotating electric machine 101 is higher than the first setting rotation speed a and the same as or lower than the second setting rotation speed b and a fourth torque compensation amount setting region 434 that stores the torque compensation amount corresponding to the fourth control method to be utilized when the rotation speed of the rotating electric machine 101 is higher than the third setting rotation speed c.

The torque compensation amount map selector 202 may utilize only the control information D in order to select the torque compensation amount map; alternatively, when the control method in the PAM control has been preliminarily determined for the detection rotation speed S, the torque compensation amount map selector 202 may utilize only the detection rotation speed S so as to select the torque compensation amount map.

Here, as a comparative example for Embodiment 2 of the present invention, there will be described the case where only one torque compensation amount map is provided. In the case of this comparative example, a single torque compensation amount map is provided with the first torque compensation amount setting region corresponding to the first control method in the region of a speed that is the same as or lower than the first setting rotation speed a, the second torque compensation amount setting region corresponding to the second control method in the region of a speed that is higher than the first setting rotation speed a and the same as or lower than the second setting rotation speed b, the third torque compensation amount setting region corresponding to the third control method in the region of a speed that is higher than the second setting rotation. speed b and the same as or lower than the third setting rotation speed c, and the fourth torque compensation amount setting region corresponding to the fourth control method in the region of a speed higher than the third setting rotation speed c.

In the case of this comparative example, for example, when the torque compensation amount at a time when the rotation speed is slightly lower than the first setting rotation speed a is obtained through interpolation, there exists no problem; however, because in the case where the torque compensation amount at a time when the rotation speed is slightly higher than the first setting rotation speed a is obtained through interpolation, the torque compensation amount corresponding to the second control method calculated based on the torque compensation amounts corresponding to the first and second control methods; thus, there is calculated a value that is different from the value calculated when the torque compensation amount corresponding to the second control method is obtained from the second torque compensation amount setting region. Therefore, the accuracy of the torque to be outputted from the rotating electric machine 101 is deteriorated.

In contrast to the foregoing comparative example, as illustrated in FIG. 4, Embodiment 2 of the present invention is provided with two torque compensation amount maps, i.e., the first torque compensation amount map 401 and the second torque compensation amount map 402; the first torque compensation amount map 401 has the first torque compensation amount setting region 431 and the third torque compensation amount setting region 433; the second torque compensation amount map 402 has the second torque compensation amount setting region 432 and the fourth torque compensation amount setting region 434.

As described above, in the rotating-electric-machine control apparatus according to Embodiment 2 of the present invention, the first torque compensation amount map 401 and the second torque compensation amount map 402 are separated from each other; thus, for example, because in the case where the torque compensation amount at the time when the rotation speed of the rotating electric machine 101 is slightly higher than the first setting rotation speed a is obtained through interpolation, the torque compensation amount can be calculated through interpolation, based only the second torque compensation amount setting region 432 stored in the second torque compensation amount map 402, the accuracy of the torque to be outputted from the rotating electric machine 101 can be raised.

Embodiment 3

Figure 5:
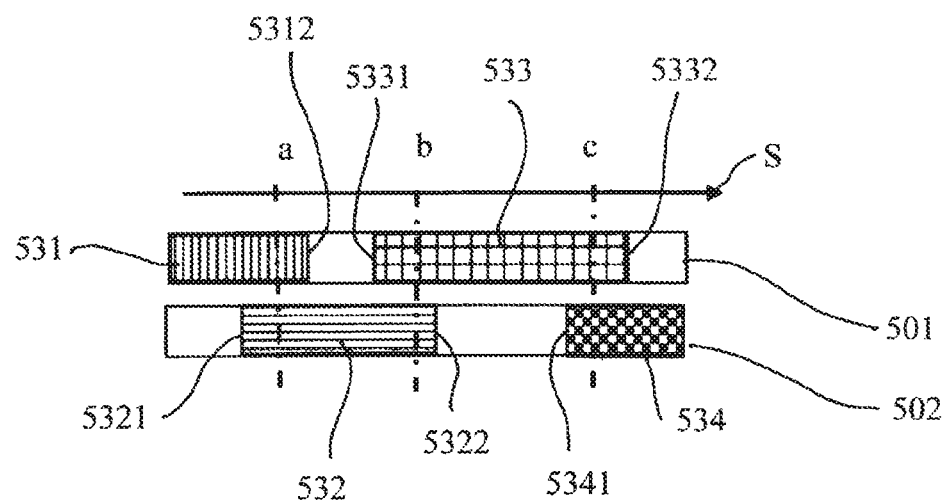
FIG. 5 is an explanatory chart representing the configuration of a torque compensation amount map in the rotating-electric-machine control apparatus according to Embodiment 3 of the present invention.

Next, a rotating-electric-machine control apparatus according to Embodiment 3 of the present invention will be explained. FIG. 5 is an explanatory chart representing the configuration of a torque compensation amount map in the rotating-electric-machine control apparatus according to Embodiment 3 of the present invention. In foregoing Embodiment 2, the torque compensation amount setting region in the torque compensation amount map is divided based on the first setting rotation speed a, the second setting rotation speed b, and the third setting rotation speed c; however, in Embodiment 3 of the present invention, the adjacent torque compensation amount setting regions are overlapped with one another at the respective setting rotation speeds. The other configurations are the same as those of the foregoing rotating-electric-machine control apparatus according to Embodiment 2.

In FIG. 5, the abscissa denotes the detection rotation speed S outputted by the rotation speed detection unit 112. As is the case with FIG. 3, the detection rotation speed S includes three setting rotation speeds, i.e., the first setting rotation speed a, the second setting rotation speed b, and the third setting rotation speed c, as two or more setting rotation speeds for switching the control methods in the PWM control.

A first torque compensation amount map 501 has a first torque compensation amount setting region 531 that stores the torque compensation amount corresponding to the first control method to be utilized when the rotation speed of the rotating electric machine 101 is the same as or lower than the first setting rotation speed a and a third torque compensation amount setting region 533 that stores the torque compensation amount corresponding to the third control method to be utilized when the rotation speed of the rotating electric machine 101 is higher than the second setting rotation speed b and the same as or lower than the third setting rotation speed c.

A second torque compensation amount map 502 has a second torque compensation amount setting region 532 that stores the torque compensation amount corresponding to the second control method to be utilized when the rotation speed of the rotating electric machine 101 is higher than the first setting rotation speed a and the same as or lower than the second setting rotation speed b and a fourth torque compensation amount setting region 534 that stores the torque compensation amount corresponding to the fourth control method to be utilized when the rotation speed of the rotating electric machine 101 is the same as or higher than the third setting rotation speed C.

The first control method, the second control method, the third control method, and the fourth control method are different control methods, for example, in the PWM control, and are the same as those described in foregoing Embodiment 1.

The first torque compensation amount setting region 531 is provided in the first torque compensation amount map 501 in such a way as to extend from a position corresponding to the detection rotation speed S that is the same as or lower than the first setting rotation speed a to a position corresponding to the detection rotation speed S that is slightly higher than the first setting rotation speed a. The second torque compensation amount setting region 532 is provided in the second torque compensation amount map 502 in such a way as to extend from a position corresponding to the detection. rotation speed S that is slightly lower than the first setting rotation speed a to a position corresponding to the detection rotation speed S that is slightly higher than the second setting rotation speed b.

The third torque compensation amount setting region 533 is provided in the first torque compensation amount map 501 in such a way as to extend from a position corresponding to the detection rotation speed S that is slightly lower than the second setting rotation speed b to a position corresponding to the detection rotation speed S that is slightly higher than the third setting rotation speed c. The fourth torque compensation amount setting region 534 is provided in the second torque compensation amount map 502 in such a way as to extend from a position corresponding to the detection rotation speed S that is slightly lower than the third setting rotation speed c to a position corresponding to the detection rotation speed S that is the same as or higher than the third setting rotation speed c.

As described above, the first torque compensation amount setting region 531 and the second torque compensation amount setting region 532 are provided separately in the first torque compensation amount map 501 and the second torque compensation amount map 502, respectively, in such a way as to overlap with each other in accordance with the detection rotation speed S around the first setting rotation speed a; the third torque compensation amount setting region 533 and the second torque compensation amount setting region 532 are provided separately in the first torque compensation amount map 501 and the second torque compensation amount map 502, respectively, in such a way as to overlap with each other in accordance with the detection rotation speed S around the second setting rotation speed b. The third torque compensation amount setting region 533 and the fourth torque compensation amount setting region 534 are provided separately in the first torque compensation amount map 501 and the second torque compensation amount map 502, respectively, in such a way as to overlap with each other in accordance with the detection rotation speed S around the third setting rotation speed c.

The torque compensation amount map selector 202 may utilize only the control information D in order to select the torque compensation amount map; alternatively, when the control method in the PWM control has been preliminarily determined for the detection rotation speed S, the torque compensation amount map selector 202 may utilize only the detection rotation speed S so as to select the torque compensation amount map.

As described above, in the rotating-electric-machine control apparatus according to Embodiment 3 of the present invention, each of the torque compensation amount setting regions is separated in the two or more torque compensation amount maps and the adjacent torque compensation amount setting regions are provided in such a way as to overlap with each other; therefore, for example, even when determination by the voltage applying unit on switching of the control methods in the PWM control is delayed, the torque accuracy can be maintained.

Embodiment 4

Figure 6:
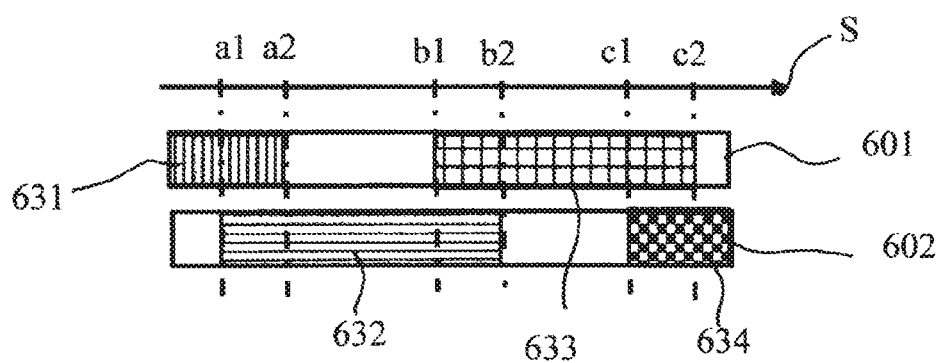
FIG. 6 is an explanatory chart representing the configuration of a torque compensation amount map in the rotating-electric-machine control apparatus according to Embodiment 4 of the present invention.

Next, a rotating-electric-machine control apparatus according to Embodiment 4 of the present invention will be explained. FIG. 6 is an explanatory chart representing the configuration of a torque compensation amount map in the rotating-electric-machine control apparatus according to Embodiment 4 of the present invention. In Embodiment 4, it is preliminarily determined that when the detection rotation speed obtained from the detection rotation speed S for detecting the rotation speed of the rotating electric machine becomes a predetermined setting rotation speed, the control methods in the PWM control are switched; moreover, the setting rotation speed differs depending on whether the rotation speed of the rotating electric machine 101 is rising or falling; in addition, a single torque compensation amount map has two or more torque compensation amount setting regions; thus, the information amount to be stored in the rotating-electric-machine control apparatus is reduced. The other configurations are the same as those of the foregoing rotating-electric-machine control apparatus according to Embodiment 1.

In FIG. 6, the abscissa denotes the detection rotation speed S detected by the rotation speed detection unit 112. The detection rotation speed S includes six setting rotation speeds, i.e., a first setting rotation speed a1, a second setting rotation speed a2, a third setting rotation speed b1, a fourth setting rotation speed b2, a fifth setting rotation speed c1, and a sixth setting rotation speed c2, as two or more setting rotation speeds for switching the control methods in the PWM control.

When the rotation speed of the rotating electric machine 101 rises, the two or more setting rotation speeds are set in such a way that the PWM control is switched from the first control method to the second control method at the second setting rotation speed a2, that the PWM control is switched from the second control method to the third control method at the fourth setting rotation speed b2, and that the PWM control is switched from the third control method to the fourth control method at the sixth setting rotation speed c2.

When the rotation speed of the rotating electric machine falls, the two or more setting rotation speeds are set in such a way that the PWM control is switched from the fourth control method to the third control method at the fifth setting rotation speed c1, that the PWM control is switched from the third control method to the second control method at the third setting rotation speed b1, and that the PWM control is switched from the second control method to the first control method at the first setting rotation speed a1.

The second setting rotation speed a2 is set to be higher than the first setting rotation speed a1, the fourth setting rotation speed b2 is set to be higher than the third setting rotation speed b1, and the sixth setting rotation speed c2 is set to be higher than the fifth setting rotation speed c1, so that any one of the control methods exists in the whole detection rotation speed S.

The first control method, the second control method, the third control method, and the fourth control method are different control methods in the PWM control; for example, as described in Embodiment 1, the respective contents of the control methods differ from one another in terms of the carrier frequency, the ratio of the carrier frequency to the detection rotation speed, correspondence to the two-phase modulation method, or the three-phase modulation method.

In Embodiment 4 of the present invention, the first torque compensation amount setting region 631 corresponding to the first control method is set in the first torque compensation amount map 601 up to the second setting rotation speed a2. The second torque compensation amount setting region 632 corresponding to the second control method is set in the second torque compensation amount map 602 from the first setting rotation speed a1 to the fourth setting rotation speed b2. The third torque compensation amount setting region 633 corresponding to the third control method is set in the first torque compensation amount map 601 from the third setting rotation speed b1 to the sixth setting rotation speed c2. Furthermore, the fourth torque compensation amount setting region 634 corresponding to the fourth control method is set in the second torque compensation amount map 602 for the fifth setting rotation speed c1 or higher.

As described above, the lower limit of the setting-region setting range corresponding to each of the control methods is set in such a way as to correspond to the setting rotation speed at a time when the detection rotation speed S falls; the setting-range upper limit of the torque compensation amount setting region is set in such a way as to correspond to the setting rotation speed at a time when the detection rotation speed S rises.

The torque compensation amount map selector 202 may utilize only the control information D in order to select the torque compensation amount map; alternatively, when the control method in the PAM control has been preliminarily determined for the detection rotation speed S, the torque compensation amount map selector 202 may utilize only the detection rotation speed S so as to select the torque compensation amount map.

As described above, the setting rotation speed for switching the control methods in the PAM control made to differ depending on whether the rotation speed of the rotating electric machine rises or falls, so that the probability that around the PWM-control-switching setting rotation speed, the control methods in the PWM control are frequently switched is decreased; thus, the control can be stabilized.

Embodiment 5

Figure 7:
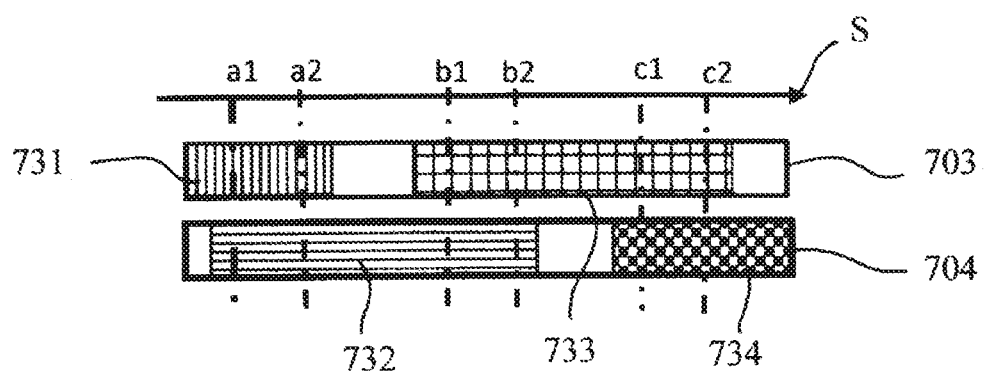
FIG. 7 is an explanatory chart representing the configuration of a torque compensation amount map in the rotating-electric-machine control apparatus according to Embodiment 5 of the present invention.

Next, a rotating-electric-machine control apparatus according to Embodiment 5 of the present invention will be explained. FIG. 7 is an explanatory chart representing the configuration of a torque compensation amount map in the rotating-electric-machine control apparatus according to Embodiment 5 of the present invention. In foregoing Embodiment 4 represented in FIG. 6, the torque compensation. amount setting region is divided into the first setting rotation speed a1, the second setting rotation speed a2, the third setting rotation speed b1, the fourth setting rotation speed b2, the fifth setting rotation speed c1, and the sixth setting rotation speed c2; however, in Embodiment 5 of the present invention, represented in FIG. 7, the lower limit or the upper limit of each of the torque compensation amount setting regions is set in such a way as to be slightly lower or slightly higher, as the case may be, than the corresponding setting rotation speed. The other configurations are the same as those of the foregoing rotating-electric-machine control apparatus according to Embodiment 4.

In other words, in FIG. 7, the first torque compensation amount setting region 731 corresponding to the first control method is set in the first torque compensation amount map 703 up to the detection rotation speed S slightly higher than the second setting rotation speed a2. The second torque compensation amount setting region 732 corresponding to the second control method is set in the second torque compensation amount, map 704 from the detection rotation speed S slightly lower than. the first setting rotation speed a1 to the detection rotation speed S slightly higher than the fourth setting rotation speed b2.

The third torque compensation amount setting region 733 corresponding to the third control method is set in the first torque compensation amount map 703 from the detection rotation speed S slightly lower than the third setting rotation speed b1 to the detection rotation speed S slightly higher than the sixth setting rotation speed c2. Furthermore, the fourth torque compensation amount setting region 734 corresponding to the fourth control method is set in the second torque compensation amount map 704 for the detection rotation speed S that is slightly lower than the fifth setting rotation speed c1 or higher.

As described above, the setting-range lower limit of the torque compensation amount setting region corresponding to each of the control methods is set in accordance with the detection rotation speed slightly lower than the setting rotation speed at a time when the detection rotation speed S falls; the setting-range upper limit of the torque compensation amount setting region is set in accordance with the detection rotation speed slightly higher than the setting rotation speed at a time when the detection rotation speed S rises The rotating-electric-machine control apparatus according to Embodiment 5 of the present, invention is configured in such a manner as described above; thus, even when determination by the voltage applying unit 114 on switching of the control methods in the PWM control is delayed, the torque accuracy can be maintained.

The torque compensation amount map selector 202 may utilize only the control information D in order to select the torque compensation amount map; alternatively, when the control method in the PAM control has been preliminarily determined for the detection rotation speed S, the torque compensation amount map selector 202 may utilize only the detection rotation speed S so as to select the torque compensation. amount map.

Embodiment 6

Next, a rotating-electric-machine control apparatus according to Embodiment 6 of the present invention will be explained.

Figure 8:
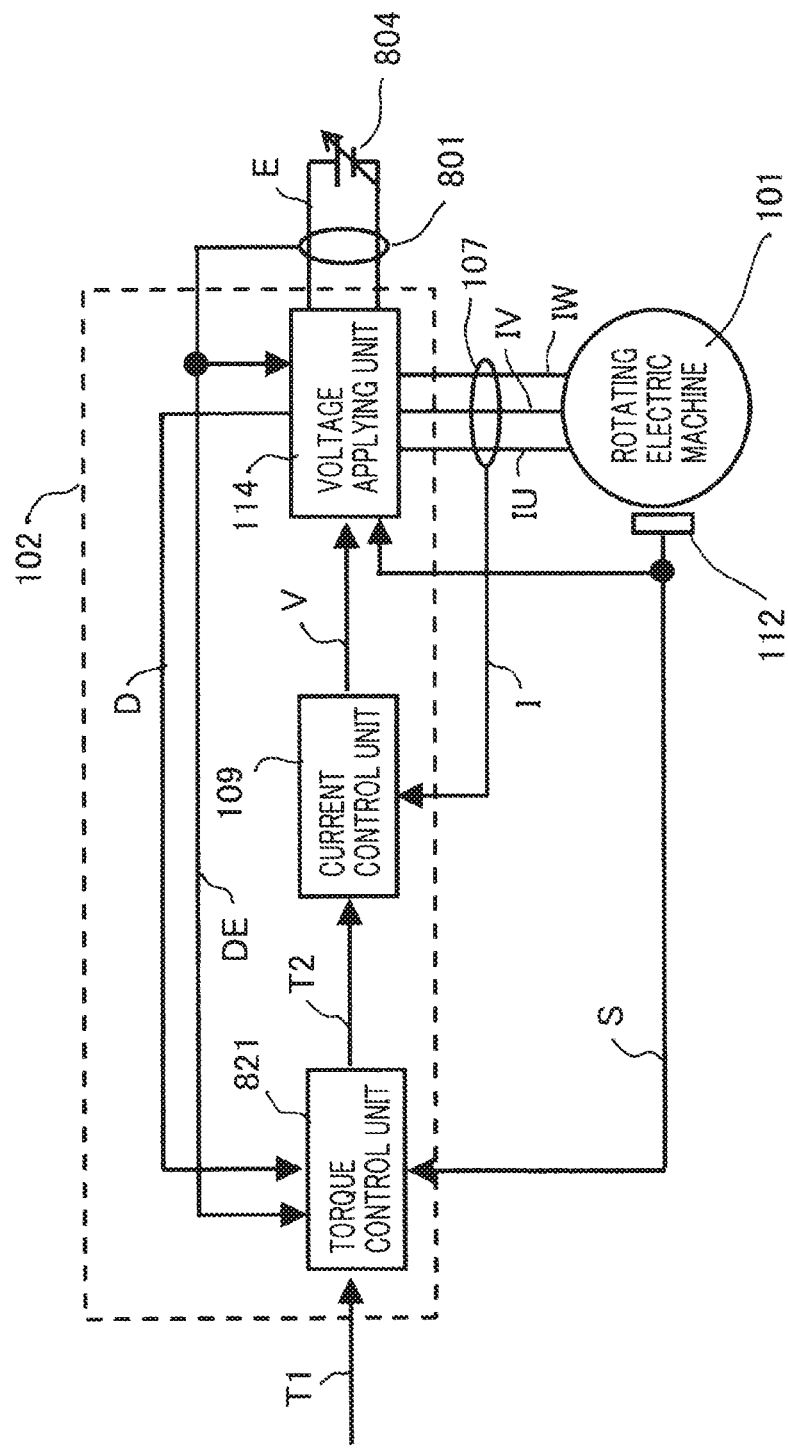
FIG. 8 is a control block diagram representing a rotating-electric-machine control apparatus according to Embodiment 6 of the present invention.

FIG. 8 is a control block diagram representing a rotating-electric-machine control apparatus according to Embodiment 6 of the present invention. In each of foregoing Embodiments 1 through 5, the DC power source is formed of a DC constant voltage source that generates a constant DC voltage; however, in Embodiment 6 of the present invention, the DC power source is formed of a variable DC voltage source.

In FIG. 8, a rotating-electric-machine control apparatus 102 controls electric power to be supplied to the armature winding (unillustrated) of a rotating electric machine 101, which is, for example, a three-phase AC motor, so as to control the output of the rotating electric machine 101. The rotating-electric-machine control apparatus 102 in FIG. 8 is represented, as a configuration at a time when torque control of the rotating electric machine 101 is performed, and is provided with a voltage applying unit 114 as a voltage applying devise, a torque control unit 821 as a torque controller, and a current control unit 109 as a current controller.

The voltage applying unit 114 converts a DC voltage F, which is the output voltage of a DC power source 804, into an AC voltage, and applies the AC voltage to the armature winding of the rotating electric machine 101. The DC power source 804 is formed of a variable DC power source that can arbitrarily change the DC voltage C, which is the output thereof The DC voltage applied to the voltage applying unit 114 is detected by a voltage detection unit 801 as a voltage detector; as described later, the detected DC voltage is inputted, as a detection DC voltage DE, to the torque control unit 821. Armature currents IU, IV, and IW to be outputted from the voltage applying unit 114 are supplied to the armature winding (unillustrated) of the rotating electric machine 101.

There exist two or more control methods that are utilized in the voltage applying unit 114. For example, there can be utilized PWM control in which a comparator or the like compares a command signal with a carrier wave such as a triangular wave or a sawtooth wave and then a time in which a DC voltage is applied is changed, based on the result of the comparison.

As described in foregoing Embodiment 1, there exist two or more control methods in the PWM control. In the rotating-electric-machine control apparatus according to Embodiment 6 of the present invention, the foregoing PWM control is configured, as described later, in such a way that one specific control method among the foregoing two or more control methods can be switched to another control method, based on the rotation speed of the rotating electric machine 101.

The voltage applying unit 114 inputs control information D, which indicates which type of control method is the present control method utilized for the PWM control, to an after-mentioned torque compensation amount map selector in the torque control unit 821. The control information D is information that indicates which type of control method is the control method in the present PWM control.

Based on the control information D inputted from the voltage applying unit 114 and the detection rotation speed S inputted from the rotation speed detection unit 112, the torque control unit 821 corrects the first torque command T1 provided from the outside and outputs as a second torque command T2 for controlling the inside of the rotating electric machine 101. Describing in more detail, in order to stabilize the output torque of the rotating electric machine 101, the torque control unit 121 corrects the first torque command T1 based on a torque compensation amount, generates the second torque command T2 suitable for the control method in the PWM control and outputs the second torque command T2.

It may be allowed that instead of switching the control method in the PWM control in accordance with the detection rotation speed S, the foregoing control method in the PWM control switched in accordance with an after-mentioned first torque command T1 for the rotating electric machine 101.

The current control unit 109 converts the second torque command T2 outputted from the torque control unit 821 into a voltage command V and provides the voltage command V to the voltage applying unit 114. Based on the voltage command V provided from the current control unit 109, the voltage applying unit 114 converts the DC voltage B into an AC voltage, through the foregoing PWM control, and then applies the AC voltage to the armature winding of the rotating electric machine 101. As a result, the voltage applying unit 114 supplies the armature currents IU, IV, and IW, which are three-phase alternating currents, to the armature winding of the rotating electric machine 101. The stator of the rotating electric machine 101 generates a rotating magnetic field, based on the three-phase armature currents IU, IV, and IW supplied to the armature winding, so as to rotate the rotor.

The current control unit 109 performs current feedback control by use of a current command value and a detection current I outputted. from a current detection unit 107 as a current detector that measures the armature currents IU, IV, and IW, which are three-phase AC currents and flow between the rotating electric machine 101 and the voltage applying unit 114.

Figure 9:
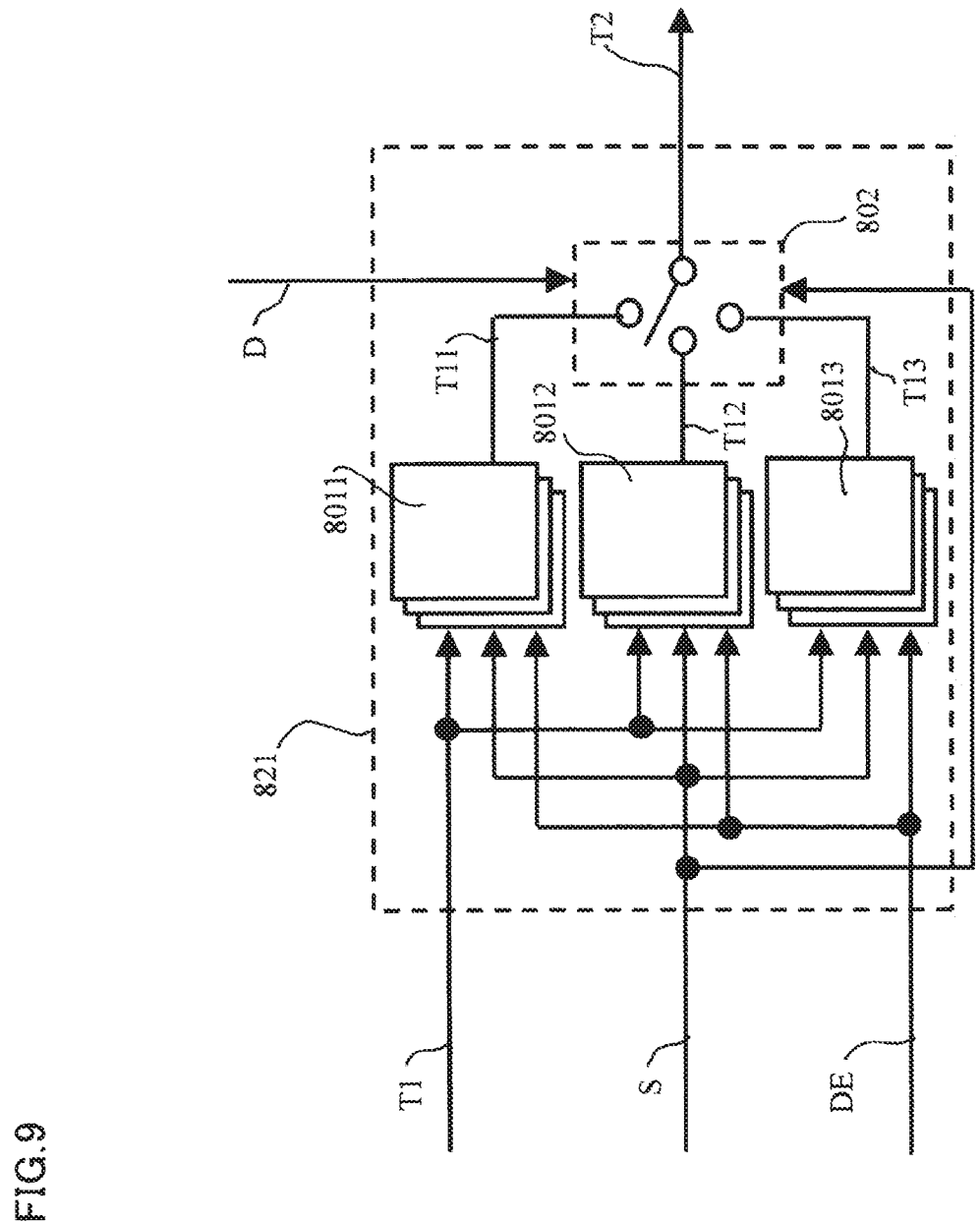
FIG. 9 is a control block diagram representing the internal configuration of a torque control unit in the rotating-electric-machine control apparatus according to Embodiment 6 of the present invention.

Next, the foregoing torque control unit 821 will be explained in detail FIG. 9 is a control block diagram representing the internal. configuration unit the torque control in the rotating-electric-machine control apparatus according to Embodiment 6 of the present invention. In FIG. 9, the torque control unit 821 is provided with a first torque compensation amount map group 8011, a second torque compensation amount map group 8012, and a third torque compensation amount map group 8013, which are two or more torque compensation amount map groups. The torque control unit 821 is further provided with a torque compensation amount map selector 802. The number of the torque compensation amount map groups is not limited to 3 represented in FIG. 9; the number thereof may be the same as or smaller than 3 or larger than 3.

As described above, the DC power source 804 is configured in such a way that the DC voltage E thereof can be changed; the torque compensation amount may differ depending on the changed DC voltage E. Therefore, in the torque control unit 821, the detection DC voltage DE is added, as an input variable, to the first torque command T1 and the detection rotation speed S.

The first torque compensation amount map group 8011 includes two or more first torque compensation amount maps. Each of the first torque compensation amount maps included in the first torque compensation amount map group 8011 is provided with a first torque compensation amount to be utilized, for example, in the foregoing first control method in the PWM control; the respective first torque compensation amount maps have the first torque compensation amounts that each correspond to the detection DC voltage DE and are different from one another.

The second torque compensation amount map group 8012 includes two or more second torque compensation amount maps e Each of the second torque compensation amount maps included in the second torque compensation amount map group 8012 is provided with a second torque compensation amount to be utilized, for example, in the foregoing second control method in the PWM control; the respective second torque compensation amount maps have the second torque compensation amounts that each correspond to the detection DC voltage DE and are different from one another.

The third torque compensation amount map group 8013 includes two or more third torque compensation amount maps. Each of the third torque compensation amount maps included in the third torque compensation amount map group 8013 is provided with a third torque compensation amount to be utilized, for example, in the foregoing third control method in the PWM control; the respective third torque compensation amount maps have the third torque compensation amounts that each correspond to the detection DC voltage DE and are different from one another.

The first torque compensation amount map group 8011 is a torque compensation amount map group for obtaining the optimum second torque command T2 for the first control method in the PWM control; when the first torque command T1, the detection rotation speed S, and the detection DC voltage DE are determined, one first torque compensation amount is uniquely calculated from one of the two or more first torque compensation amount maps; the calculated first torque compensation amount is added to the first torque command T1, so that the first compensated torque command T11 is outputted.

The first torque compensation amount map is configured as a map for the discrete first torque command the discrete detection. rotation speed S and the discrete detection DC voltage DE; the first torque compensation amount in the discrete-value region may be obtained through linear interpolation, by extracting the most approximate discrete value, or through spline interpolation.

The second torque compensation amount map group 8012 is a torque compensation amount map group for obtaining the optimum second torque command T2 for the second control method in the PWM control; when the first torque command T1, the detection rotation speed S, and the detection DC voltage DE are determined, one second torque compensation amount is uniquely calculated from one of the two or more second torque compensation amount maps; the calculated second torque compensation amount is added to the first torque command T1, so that the second compensated torque command T12 is outputted.

The second torque compensation amount map is configured as a map for the discrete first torque command T1, the discrete detection rotation speed S and the discrete detection DC voltage DE; the second torque compensation amount in the discrete-value region may be obtained through linear interpolation, by extracting the most approximate discrete value, or through spline interpolation.

The third torque compensation amount map group 8013 is a torque compensation amount map group for obtaining the optimum second torque command T2 for the third control method in the PWM control; when the first torque command T1, the detection rotation speed S, and the detection DC voltage DE are determined, one third torque compensation amount is uniquely calculated from one of the two or more third torque compensation amount maps; the calculated third torque compensation amount is added to the first torque command T1, so that the third compensated torque command T13 is outputted.

The third torque compensation amount map is configured as a map for the discrete first torque command T1, the discrete detection rotation speed S and the discrete detection DC voltage DE; the third torque compensation amount in the discrete-value region may be obtained through linear interpolation, by extracting the most approximate discrete value, or through spline interpolation.

Based on the control information D inputted from the voltage applying unit 114, the torque compensation amount map selector 802 selects any one of the first compensated torque command T11 outputted from the first torque compensation amount map group 8011, the second compensated torque command T12 outputted from the second torque compensation amount map group 8012, and the third compensated torque command T13 outputted from the third torque compensation amount map group 8013; then, the torque compensation amount map selector 802 outputs the selected compensated torque command, as the second torque command T2. In other words, the torque compensation amount map selector 802 selects the torque compensation amount map group corresponding to the control method in the PWM control, which is indicated by the inputted control information D, selects, from the selected torque compensation amount map group, the torque compensation amount map storing the torque compensation amount corresponding to the detection DC voltage DE, and then outputs the compensated torque command outputted from the selected torque compensation amount map, as the second torque command T2.

The torque compensation amount map selector 802 may utilize only the control information D in order to select the torque compensation amount map; alternatively, when the control method in the PWM control has been preliminarily determined for the detection rotation speed S, the torque compensation amount map selector 802 may utilize only the detection rotation speed S so as to select the torque compensation amount map group.

Each of the configurations of the two or more torque compensation amount maps in the first torque compensation amount map group 8011, the second torque compensation amount map group 8012, and the third torque compensation amount map group 8013 is the same as the configuration of the torque compensation amount map described in any one of foregoing Embodiments 1 through 5.

The current control unit 109 converts the second torque command 12, corrected in accordance with the control method in the PWM control, which is selected corresponding to the detection rotation speed 6, into the voltage command V and then provides the voltage command to the voltage applying unit 114. Eased on the voltage command V provided from the current control unit 109, the voltage applying unit 114 converts the DC voltage E into an AC voltage, through the foregoing control method in the PWM control, and then applies the AC voltage to the armature winding of the rotating electric machine 101.

The rotating-electric-machine control apparatus according to Embodiment 6 of the present invention. is configured in such a manner as described above; therefore, even when the DC voltage E, which is the output of the DC, power source 604, is changed, it is made possible to control the voltage applying unit 114, based on the optimum torque command corresponding to the changed DC voltage, and hence the accuracy of the torque control can be raised.

Foregoing Embodiments 1 through 5 are respective reductions to practice of the following inventions (1) through (6).
(1) A rotating-electric-machine control apparatus comprising:
a voltage applying device that converts a DC voltage outputted from a DC power source into an AC voltage and then applies the AC voltage converted to a rotating electric machine;
a rotation speed detector that detects a rotation speed of the rotating electric machine and then output the rotation speed detected, as a detection rotation speed;
a current detector that detects a current flowing in the rotating electric machine and then outputs the current detected, as a detection current;
a torque controller that generates a second torque command, based on a first torque command provided from the outside and the detection rotation speed, and then outputs the second torque command generated; and
a current controller that generates a voltage command, based on the second torque command and the detection current, and then outputs the voltage command generated, wherein based on the voltage command outputted from the current controller, the voltage applying device is controlled,
wherein the voltage applying device converts the DC voltage into the AC voltage by use of any one of two or more different control methods, and switches the control method utilized in the conversion from one of the two or more control methods to another control method, based on a rotation speed of the rotating electric machine,
wherein the torque controller includes
two or more torque compensation amount maps that each store a torque compensation amount corresponding to a detection rotation speed and a first torque command and
a torque compensation amount map selector that selects a single torque compensation amount map from the two or more torque compensation amount maps, based on at least one of the detection rotation speed and control information indicating a control method utilized in the conversion by the voltage applying device, and
wherein the torque compensation amount stored in the torque compensation amount map selected by the torque compensation amount map selector is added to the first torque command and is outputted as the second torque command.

This invention makes it possible to calculate a torque compensation amount corresponding to an operating control method when control methods for converting a DC voltage of the rotating-electric-machine control apparatus into an AC voltage are switched; thus, deterioration of the torque accuracy due to the switching of the control methods is prevented and hence the torque accuracy can be raised.

(2) The rotating-electric-machine control apparatus according to (1),
wherein each of the two or more torque compensation amount maps outputs a compensated torque command generated by adding the torque compensation amount stored therein to the first torque command, and
wherein the torque compensation amount map selector outputs, as the second torque command, the compensated torque command outputted by the torque compensation amount map selected based on control information indicating the control method that is utilized in the conversion by the voltage applying device.

This invention makes it possible to calculate a torque compensation amount corresponding to an operating control method when control methods for converting a DC voltage of the rotating-electric-machine control apparatus into an AC voltage are switched; thus, deterioration of the torque accuracy due to the switching of the control methods is prevented and hence the torque accuracy can be raised.

(3) The rotating-electric-machine control apparatus according to (1) wherein the voltage applying device is controlled through PWM control, and
wherein the two or more different control methods are two or more different control methods in the PWM control.

This invention makes it possible to calculate a torque compensation amount corresponding to an operating control method when control methods in the PWM control for converting a DC voltage of the rotating-electric-machine control apparatus into an AC voltage are switched; thus, deterioration of the torque accuracy due to the switching of the control methods is prevented and hence the torque accuracy can be raised.

(4) The rotating-electric-machine control apparatus according to (1), wherein the two or more different control methods in the PWM control include at least any two control methods out of a first control method for control ting a carrier frequency of a carrier wave to be utilized in the PWM control, a second control method for controlling the ratio of the carrier frequency to the detection rotation speed, a third control method based on a three-phase modulation method in which the respective modulation of the three-phase output voltages of the voltage applying device are the same, and a fourth control method based on a two-phase modulation method in which two of the three-phase output voltages are modulated.

This invention makes it possible to calculate a torque compensation amount corresponding to an operating control method when control methods in the PWM control for converting a DC voltage of the rotating-electric-machine control apparatus into an AC voltage are switched; thus, deterioration of the torque accuracy due to the switching of the control methods is prevented and hence the torque accuracy can be raised.

(5) The rotating electric-machine control apparatus according to (1),
  wherein the number of the two or more torque compensation amount maps is the same as at least the number of the two or more control methods,
  wherein the two or more torque compensation amount maps are provided in such a way as to correspond to the respective two or more control methods, and
  wherein based on control information indicating the control method that is utilized. in the conversion by the voltage applying device, the torque compensation amount map selector selects a single torque compensation amount map from the two or more torque compensation amount maps.

This invention makes it possible that by providing torque compensation amount maps that are stored in a microcomputer and are the same in number as at least the control methods, any one of the control methods is accepted and hence the torque accuracy is prevented from being deteriorated.

(6) The rotating-electric-machine control apparatus according to (1),
  wherein a rotation speed range of the rotating electric machine that operates through the single control method of the two or more control methods is preliminarily determined, and
  wherein one of the two or more torque compensation amount maps has a torque compensation amount corresponding to the single control method that corresponds to the rotation speed range.

This invention makes it possible that in the case where the rotation speed at which the control methods are switched is preliminarily set, the number of the torque compensation amount maps is decreased and hence the storage amount of the microcomputer is reduced.

Foregoing Embodiments 2 and 3 are respective reductions to practice of the following invention (7).

(7) The rotating-electric-machine control apparatus according to (6)
  wherein the two or more torque compensation amount maps have at least a first torque compensation amount map and a second torque compensation amount map,
  wherein the first torque compensation amount map has torque compensation amounts corresponding to two or more predetermined control methods that correspond to the respective two or more predetermined rotation speed ranges, and
  wherein the second torque compensation amount map has torque compensation amounts corresponding to two or more predetermined control methods that correspond to other two or more predetermined rotation speed ranges different from the two or more predetermined rotation speed ranges and that are different from the two or more predetermined control methods.

This invention makes it possible that the number of the torque compensation amount maps is decreased and hence the storage amount of the microcomputer is reduced.

Foregoing Embodiments 4 and 5 are respective reductions to practice of the following invention (8).

(8) The rotating-electric-machine control apparatus according to (1),
  wherein in the case where while the rotation speed of the rotating electric machine rises and a predetermined detection rotation speed is reached, the voltage applying device switches the control method to be utilized in the conversion from one of the control methods out of the two or more control methods to another control method; in the case where while the rotation speed of the rotating electric machine falls, another predetermined detection rotation speed that is different from said predetermined detection rotation speed is reached, the voltage applying device switches the control method from said another control method to said one control method,
  wherein the predetermined detection rotation speed at a time when the rotation speed rises is set to be higher than said another predetermined rotation speed at a time when the rotation speed falls, and
  wherein when the rotation speed rises and has not reached the predetermined detection rotation speed, the torque controller selects one torque compensation amount map including a torque compensation amount corresponding to said one control method; when the rotation speed is the same as or higher than the predetermined detection. rotation speed, the torque controller selects another torque compensation amount map including a torque compensation amount corresponding to said another control method; when the rotation speed falls and has not reached said another predetermined detection rotation speed, the torque controller selects said another torque compensation amount map including a torque compensation amount corresponding to said another control method; when the rotation speed is the same as or lower than said another predetermined detection rotation speed, the torque controller selects said one torque compensation amount map including a torque compensation amount corresponding to said one control method.

This invention makes it possible that even when the rotation speed at which the control methods are switched is set in such a way as to differ depending on whether the rotation speed rises or falls, the storage amount of the microcomputer is decreased and correction of the torque command is smoothly performed.

Foregoing Embodiment 4 is a reduction to practice of the following invention (9).

(9) The rotating-electric-machine control apparatus according to (8), wherein the upper limit of a torque compensation amount setting region including the torque compensation amount is set in accordance with said predetermined detection rotation speed at a time when the rotation speed rises; the lower limit of the torque compensation amount setting region including the torque compensation amount is set in accordance with said another predetermined detection rotation speed at a time when the rotation speed falls.

This invention makes it possible that even when the rotation speed at which the control methods are switched is set in such a way as to differ depending on whether the rotation speed rises or falls, the storage amount of the microcomputer is decreased and correction of the torque command is smoothly performed.

Foregoing Embodiment 5 is a reduction to practice of the following invention (10).

(10) The rotating-electric-machine control apparatus according to (8), wherein the upper limit of a torque compensation amount setting region including the torque compensation amount is set in accordance with a detection rotation speed higher than said predetermined detection rotation speed at a time when the rotation speed rises; the lower limit of the torque compensation amount setting region including the torque compensation amount is set in accordance with a detection rotation speed lower than said another predetermined detection rotation speed at a time when the rotation speed falls.

This invention makes it possible that even when determination on switching of the control methods by the voltage applying device is delayed, the torque accuracy is maintained.

Foregoing Embodiment 6 is respective reductions to practice of the following inventions (11) through (20).

(11) A rotating-electric-machine control apparatus comprising:
a voltage applying device that converts a DC voltage outputted from a DC power source into an AC voltage and then applies the AC voltage converted to a rotating electric machine;
a rotation speed detector that detects a rotation speed of the rotating electric machine and then output the rotation speed detected, as a detection rotation speed;
a current detector that detects a current flowing in the rotating electric machine and then outputs the current detected, as a detection current;
a torque controller that generates a second torque command, based on a first torque command provided from the outside and the detection rotation speed, and then outputs the second torque command generated; and
a current controller that generates a voltage command, based on the second torque command and the detection current, and then outputs the voltage command generated,
wherein based on the voltage command outputted from the current controller, the voltage applying device is controlled, wherein there is provided a voltage detector that detects a DC voltage outputted from the DC power source and then outputs a detection DC voltage,
wherein the voltage applying device converts the DC voltage into the AC voltage by use of any one of two or more different control methods, and switches the control method utilized in the conversion from one of the two or more control methods to another control method, based on a rotation speed of the rotating electric machine,
wherein the torque controller includes
two or more torque compensation amount map groups including two or more respective torque compensation amount maps that each store a torque compensation amount corresponding to the detection rotation speed, the first torque command, and detection DC voltage; and
a torque compensation amount map selector that selects a single torque compensation amount map group from the two or more torque compensation amount map groups, based on at least one of the detection rotation speed and control information indicating the control method, utilized in the conversion by the voltage applying device, and that selects, based on the detection DC voltage, a single torque compensation amount map from two or more torque compensation amount maps included in the selected torque compensation amount map group,
wherein the two or more torque compensation amount maps included in the torque compensation amount map group are two or more torque compensation amount, maps that are provided in such a way as to correspond to respective different values of the detection DC voltage and store respective different torque compensation amounts, and
wherein the torque compensation amount stored in the torque compensation amount map selected by the torque compensation amount map selector is added to the first torque command and is outputted as the second torque command.

This invention makes it possible that even when the DC voltage is variable, the torque accuracy is prevented from being deteriorated.

(12) The rotating-electric-machine control apparatus according to (11),
wherein each of the two or more torque compensation amount maps outputs a compensated torque command generated by adding the torque compensation amount stored therein to the first torque command, and
wherein the torque compensation amount map selector outputs, as the second torque command, the compensated torque command outputted by the torque compensation amount map selected based on the detection DC voltage.

This invention makes it possible that even when the DC voltage is variable, a torque compensation amount corresponding to an operating control method is calculated when control methods for converting a DC voltage of the rotating-electric-machine control apparatus into an AC voltage are switched; thus, deterioration of the torque accuracy due to the switching of the control methods is prevented and hence the torque accuracy can be raised.

(13) The rotating-electric-machine control apparatus according to (11),
wherein the voltage applying device is controlled through PWM control, and
wherein the two or more different control methods are two or more different control methods in the PWM control.

This invention makes it possible that even when the DC voltage is variable, a torque compensation amount corresponding to an operating control method is calculated when control methods in the PWM control for converting a DC voltage of the rotating-electric-machine control apparatus into an AC voltage are switched; thus, deterioration of the torque accuracy due to the switching of the control methods is prevented and hence the torque accuracy can be raised.

(14) The rotating-electric-machine control apparatus according to (11), wherein the two or more different control methods in the PWM control include at least any two control methods out of a first control method for controlling a carrier frequency of a carrier wave to be utilized in the PWM control, a second control method for controlling the ratio of the carrier frequency to the detection rotation speed, a third control method based on a three-phase modulation method in which the respective modulation of the three-phase output voltages of the voltage applying device are the same, and a fourth control method based on a two-phase modulation method in which two of the three-phase output voltages are modulated.

This invention makes it possible that even when the DC voltage is variable, a torque compensation amount corresponding to an operating control method is calculated when control methods in the PWM control converting a DC, voltage of the rotating-electric-machine control apparatus into an AC voltage are switched; thus, deterioration of the torque accuracy due to the switching of the control methods is prevented and hence the torque accuracy can be raised.

(15) The rotating-electric-machine control apparatus according to (11),
wherein the number of the two or ore torque compensation amount map groups is the same as at least the number of the two or more control methods,
wherein the two or more torque compensation amount map groups are provided in such a way as to correspond to the respective two or more control methods, and
wherein based on control information indicating the control method that is utilized in the conversion by the voltage applying device, the torque compensation amount, map selector selects a single torque compensation amount map group from the two or more torque compensation amount map groups.

This invention makes it possible that by providing torque compensation amount maps that are stored in a microcomputer and are the same in number as at least the control methods, any one of the control methods is accepted and hence the torque accuracy is prevented from being deteriorated.

(16) The rotating-electric-machine control apparatus according to (11),
wherein a rotation speed range of the rotating electric machine that operates through the single control method of the two or more control methods is preliminarily determined, and
wherein one of the respective two or more torque compensation amount maps included in the two or more torque compensation amount map groups has a torque compensation amount corresponding to the single control method that corresponds to the rotation speed range.

This invention makes it possible that in the case where the rotation speed at which the control methods are switched is preliminarily set, the number of the torque compensation amount maps is decreased and hence the storage amount of the microcomputer is reduced.

(17) The rotating-electric-machine control apparatus according to (16),
wherein each of the respective two or more torque compensation amount maps included in the two or more torque compensation amount map groups has at least a first torque compensation amount map and a second torque compensation amount map,
wherein the first torque compensation amount map has torque compensation amounts corresponding to two or more predetermined control methods that correspond to the respective two or more predetermined rotation speed ranges, and
wherein the second torque compensation amount map has torque compensation amounts corresponding to two or more predetermined control methods that correspond to other two or more predetermined rotation speed ranges different from the two or more predetermined rotation speed ranges and that are different from the two or more predetermined control methods.

This invention makes it possible that the number of the torque compensation amount maps is decreased and hence the storage amount of the microcomputer is reduced.

(18) The rotating-electric-machine control apparatus according to (11),
wherein in the case where while the rotation speed of the rotating electric machine rises and a predetermined detection rotation speed is reached, the voltage applying device switches the control method to be utilized in the conversion from one of the control methods out of the two or more control methods to another control method; in the case where while the rotation speed of the rotating electric machine falls, another predetermined detection rotation speed that is different from said predetermined detection rotation speed is reached, the voltage applying device switches the control method from said another control method to said one control method,
wherein the predetermined detection rotation speed at a time when the rotation speed rises is set to be higher than said another predetermined rotation speed at a time when the rotation speed falls, and
wherein when the rotation speed rises and has not reached the predetermined detection rotation speed, the torque controller selects one torque compensation amount map group including a torque compensation amount corresponding to said one control method; when the rotation speed is the same as or higher than the predetermined detection rotation speed, the torque controller selects another torque compensation amount map group including a torque compensation amount corresponding to said another control method; when the rotation speed falls and has not reached said another predetermined detection rotation speed, the torque controller selects said another torque compensation amount map group including a torque compensation amount corresponding to said another control method; when the rotation speed is the same as or lower than said another predetermined detection rotation speed, the torque controller selects said one torque compensation amount map group including a torque compensation amount corresponding to said one control method.

This invention makes it possible that even when the rotation speed at which the control methods are switched is set in such a way as to differ depending on whether the rotation speed rises or falls, the storage amount of the microcomputer is decreased and correction of the torque command is smoothly performed.

(19) The rotating-electric-machine control apparatus according to (18), wherein the upper limit of a torque compensation amount setting region including the torque compensation amount corresponding to said one control method is set in accordance with said predetermined detection rotation speed at a time when the rotation speed rises; the lower limit of the torque compensation amount setting region including the torque compensation amount corresponding to said. another control method is set in accordance with said another predetermined detection rotation speed at a time when the rotation speed falls.

This invention makes it possible that even when the rotation speed at which the control methods are switched is set in such a way as to differ depending on whether the rotation speed rises or falls, the storage amount of the microcomputer is decreased and correction of the torque command is smoothly performed.

(20) The rotating-electric-machine control apparatus according to (18), wherein the upper limit of a torque compensation amount setting region including the torque compensation amount is set in accordance with a detection rotation speed higher than said predetermined detection rotation speed at a time when the rotation speed rises; the lower limit of the torque compensation amount setting region including the torque compensation amount is set in accordance with a detection rotation speed lower than said another predetermined detection rotation speed at a time when the rotation speed falls This invention makes it possible that even when determination on switching of the control methods by the voltage applying device is delayed, the torque accuracy is maintained.

The present invention is not limited to the respective rotating-electric-machine control apparatuses according to foregoing Embodiments 1 through 6; in the scope within the spirits of the present invention, the configurations of the respective embodiments can appropriately be combined with one another, can partially be modified, or can partially be omitted.

What is claimed is:

1. A rotating-electric-machine control apparatus comprising:
   a voltage applying device that converts a DC voltage outputted. from a DC power source into an AC voltage and then applies the AC voltage converted to a rotating electric machine;
   a rotation speed detector that detects a rotation speed of the rotating electric machine and then output the rotation speed detected, as a detection rotation speed;
   a current detector that detects a current flowing in the rotating electric machine and then outputs the current detected, as a detection current;
   a torque controller that generates a second torque command, based on a first torque command provided from the outside and the detection rotation speed, and then outputs the second torque command generated; and
   a current controller that generates a voltage command, based on the second torque command and the detection current, and then outputs the voltage command generated,
   wherein based on the voltage command outputted from the current controller, the voltage applying device is controlled,
   wherein the voltage applying device converts the DC voltage into the AC voltage by use of any one of two or more different control methods, and switches the control method utilized in the conversion from one of the two or more control methods to another control method, based on a rotation speed of the rotating electric machine,
   wherein the torque controller includes
      two or more torque compensation amount maps that each store a torque compensation amount corresponding to the detection rotation speed and the first torque command; and
      a torque compensation amount map selector that selects a single torque compensation amount map from the two or more torque compensation amount maps, based on at least one of the detection rotation speed and control information indicating the control method, utilized by the voltage applying device in the conversion, and
   wherein the torque compensation amount stored in the torque compensation amount map selected by the torque compensation amount map selector is added to the first torque command and is outputted as the second torque command.

2. The rotating-electric-machine control apparatus according to claim 1,
   wherein each of the two or more torque compensation amount maps outputs a compensated torque command generated by adding the torque compensation amount stored therein to the first torque command, and
   wherein the torque compensation amount map selector outputs, as the second torque command, the compensated torque command outputted by the torque compensation amount map selected based on control information indicating the control method that is utilize in the conversion by the voltage applying device.

3. The rotating-electric-machine control apparatus according to claim 1,
   wherein the voltage applying device is controlled through PWM control, and
   wherein the two or more different control methods are two or more different, control methods in the PWM control.

4. The rotating-electric-machine control apparatus according to claim 1, wherein the two or more different control methods in the PWM control include at least any two control methods out of a first control method for controlling a carrier frequency of a carrier wave to be utilized in the PWM control, a second control method for controlling the ratio of the carrier frequency to the detection rotation speed, a third control method based on a three-phase modulation method in which the respective modulation of the three phase output voltages of the voltage applying device are the same, and a fourth control method based on a two-phase modulation method in which two of the three-phase output voltages are modulated.

5. The rotating-electric-machine control apparatus according to claim 1,
   wherein the number of the torque compensation amount maps is the same as at least the number of the two or more control methods, wherein the two or more torque compensation amount maps are provided in such a way as to correspond to the respective two or more control methods, and
   wherein based on control information indicating the control method that is utilized in the conversion by the voltage applying device, the torque compensation amount map selector selects a single torque compensation amount map from the two or more torque compensation amount maps.

6. The rotating-electric-machine control apparatus according to claim
   wherein a rotation speed range of the rotating electric machine that operates through the single control method of the two or more control methods is preliminarily determined, and
   wherein one of the two or more torque compensation amount maps has a torque compensation amount corresponding to the single control method that corresponds to the rotation speed range.

7. The rotating-electric-machine control apparatus according to claim 6, wherein the two or more torque compensation amount maps have at least a first torque compensation amount map and a second torque compensation amount map, wherein the first torque compensation amount map has torque compensation amounts corresponding to two or more predetermined control methods that correspond to the respective two or more predetermined rotation speed ranges, and wherein the second torque compensation amount map has torque compensation amounts corresponding to two or more predetermined control methods that correspond to other two or more predetermined rotation speed ranges different from the two or more predetermined rotation speed ranges and that are different from the two or more predetermined control methods.

8. The rotating-electric-machine control apparatus according to claim 1, wherein in the case where while the rotation speed of the rotating electric machine rises and a predetermined detection rotation speed is reached, the voltage applying device switches the control method to be utilized in the conversion from one of the control methods out of the two or more control methods to another control method; in the case where while the rotation speed of the rotating electric machine falls, another predetermined detection rotation speed that is different from, said predetermined detection rotation speed is reached, the voltage applying device switches the control method from said another control method to said one control method, wherein the predetermined detection rotation speed at a time when the rotation speed rises is set to be higher than said another predetermined rotation speed at a time when the rotation speed falls, and wherein when the rotation speed rises and has not reached the predetermined detection rotation speed, the torque controller selects one torque compensation amount map including a torque compensation amount corresponding to said one control method; when the rotation speed is the same as or higher than the predetermined detection rotation speed, the torque controller selects another torque compensation amount map including a torque compensation amount corresponding to said another control method; when the rotation speed falls and has not reached said another predetermined detection rotation speed, the torque controller selects said another torque compensation amount map including a torque compensation amount corresponding to said another control method; when the rotation speed is the same as or lower than said another predetermined detection rotation speed, the torque controller selects said one torque compensation amount map including a torque compensation amount corresponding to said one control method.

9. The rotating-electric-machine control apparatus according to claim 8, wherein the upper limit of a torque compensation amount setting region including the torque compensation amount is set in accordance with said predetermined detection rotation speed at a time when the rotation speed rises; the lower limit of the torque compensation amount setting region including the torque compensation amount is set in accordance with said another predetermined detection rotation speed at a time when the rotation speed falls.

10. The rotating-electric-machine control apparatus according to claim 8, wherein the upper limit of a torque compensation amount setting region including the torque compensation amount is set in accordance with a detection rotation speed higher than said predetermined detection rotation speed at a time when the rotation speed rises; the lower limit of the torque compensation amount setting region including the torque compensation amount is set in accordance with a detection rotation speed lower than said another predetermined detection rotation speed at a time when the rotation speed falls.

11. A rotating-electric-machine control apparatus comprising:

a voltage applying device that converts a DC voltage outputted from a DC power source into an AC voltage and then applies the AC voltage converted to a rotating electric machine;

a rotation speed detector that detects a rotation speed of the rotating electric machine and then output the rotation speed detected, as a detection rotation speed;

a current detector that detects a current flowing in the rotating electric machine and then outputs the current detected, as a detection current;

a torque controller that generates a second torque command, based on a first torque command provided from the outside and the detection rotation speed, and then outputs the second torque command generated; and a current, controller that generates a voltage command, based on the second torque command and the detection current, and then outputs the voltage command generated, wherein based on the voltage command outputted from the current controller, the voltage applying device is controlled, wherein there is provided a voltage detector that detects a DC voltage outputted from the DC power source and then outputs a detection DC voltage, wherein the voltage applying device converts the DC voltage into the AC voltage by use of any one of two or more different control methods, and switches the control method utilized in the conversion from one of the two or more control methods to another control method, based on a rotation speed of the rotating electric machine, wherein the torque controller includes
two or more torque compensation amount map groups including two or more respective torque compensation amount maps that each store a torque compensation amount corresponding to the detection rotation speed, the first torque command, and detection DC voltage; and a torque compensation amount map selector that selects a single torque compensation amount map group from the two or more torque compensation amount map groups, based on at least one of the detection rotation speed and control information indicating the control method, utilized in the conversion by the voltage applying device, and that selects, based on the detection DC voltage, a single torque compensation amount map from two or more torque compensation amount maps included in the selected torque compensation amount map group, wherein the two or more torque compensation amount maps included in the torque compensation amount map group are two or more torque compensation amount maps that are provided in such a way as to correspond to respective different values of the detection DC voltage and store respective different torque compensation amounts, and wherein the torque compensation amount stored in the torque compensation amount map selected by the torque compensation amount map selector is added to the first torque command and is outputted as the second torque command.

12. The rotating-electric-machine control apparatus according to claim 11,
wherein each of the two or more torque compensation amount maps outputs a compensated torque command generated by adding the torque compensation amount stored therein to the first torque command, and
wherein the torque compensation amount map selector outputs, as the second torque command, the compensated torque command outputted by the torque compensation amount map selected based on the detection DC voltage.

13. The rotating-electric-machine control apparatus according to claim 11,
wherein the voltage applying device is controlled through PWM control, and
wherein the two or more different control methods are two or more different control methods in the PWM control.

14. The rotating-electric-machine control apparatus according to claim 11, wherein the two or more different control methods in the PWM control include at least any two control methods out of a first control method for controlling a carrier frequency of a carrier wave to be utilized in the PWM control, a second control method for controlling the ratio of the carrier frequency to the detection rotation speed, a third control method based on a three-phase modulation method in which the respective modulation of the three-phase output voltages of the voltage applying device are the same, and a fourth control method based on a two-phase modulation. method in which two of the three-phase output voltages are modulated.

15. The rotating-electric-machine control apparatus according to claim 11,
wherein the number of the two or more torque compensation amount map groups is the same as at least the number of the two or more control methods,
wherein the two or more torque compensation amount map groups are provided in such a way as to correspond to the respective two or more control methods, and
wherein based on control information indicating the control method that is utilized in the conversion by the voltage applying device, the torque compensation amount map selector selects a single torque compensation amount map group from the two or more torque compensation amount map groups.

16. The rotating-electric-machine control apparatus according to claim 11,
wherein a rotation speed range of the rotating electric machine that operates through the single control method of the two or more control methods is preliminarily determined, and
wherein one of the respective two or more torque compensation amount maps included in the two or more torque compensation amount map groups has a torque compensation amount corresponding to the single control method that corresponds to the rotation speed range.

17. The rotating-electric-machine control apparatus according to claim 16,
wherein each of the respective two or more torque compensation amount maps included in the two or more torque compensation amount map groups has at least a first torque compensation amount map and a second torque compensation amount map,
wherein the first torque compensation amount map has torque compensation amounts corresponding to two or more predetermined control methods that correspond to the respective two or more predetermined rotation speed ranges, and
wherein the second torque compensation amount map has torque compensation amounts corresponding to two or more predetermined control methods that correspond to other two or more predetermined rotation speed ranges different from the two or more predetermined rotation speed ranges and that are different from the two or more predetermined control methods.

18. The rotating-electric-machine control apparatus according to claim 11
rotating electric machine rises and a predetermined detection rotation speed is reached, the voltage applying device switches the control method to be utilized in the conversion from one of the control methods out of the two or more control methods to another control method; in the case where while the rotation speed of the rotating electric machine falls, another predetermined detection rotation speed that is different from said predetermined detection rotation speed is reached, the voltage applying device switches the control method from said another control method to said one control method,
wherein the predetermined detection rotation speed at a time when the rotation speed rises is set to be higher than said another predetermined rotation speed at a time when the rotation speed falls, and
wherein when the rotation speed rises and has not reached the predetermined detection rotation speed, the torque controller selects one torque compensation amount map group including a torque compensation amount corresponding to said one control method; when the rotation speed is the same as or higher than the predetermined detection rotation speed, the torque controller selects another torque compensation amount map group including a torque compensation amount corresponding to said another control method; when the rotation speed falls and has not reached said another predetermined detection rotation speed, the torque controller selects said another torque compensation amount map group including a torque compensation amount corresponding to said another control method; when the rotation speed is the same as or lower than said another predetermined detection rotation speed, the torque controller selects said one torque compensation amount map group including a torque compensation amount corresponding to said one control method.

19. The rotating-electric-machine control apparatus according to claim 18, wherein the upper limit of a torque compensation amount setting region including the torque compensation amount is set in accordance with said predetermined detection rotation speed at a time when the rotation speed rises; the lower limit of the torque compensation amount setting region including the torque compensation amount is set in accordance with said another predetermined detection rotation speed at a time when the rotation speed falls.

20. The rotating-electric-machine control apparatus according to claim 18, wherein the upper limit of a torque compensation amount setting region including the torque compensation amount is set in accordance with a detection rotation speed higher than said predetermined detection rotation speed at a time when the rotation speed rises; the lower limit of the torque compensation amount setting region including the torque compensation amount is set in accordance with a detection rotation speed lower than said another predetermined detection rotation speed at a time when the rotation speed falls.

* * * * *